M. M. ZELLERS.
WIRE-ROPE MACHINE.
No. 184,196.
2 Sheets—Sheet 1.
Patented Nov. 7, 1876.
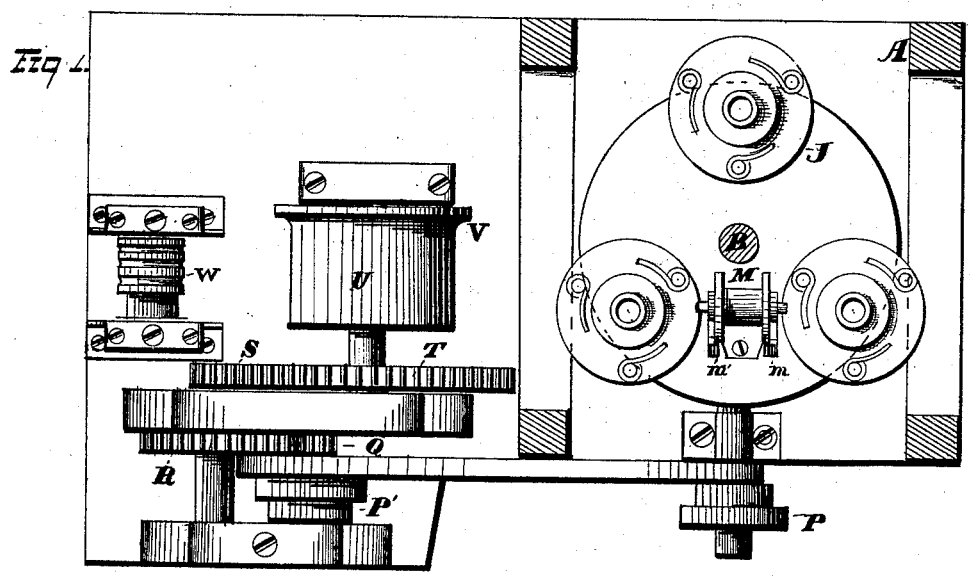
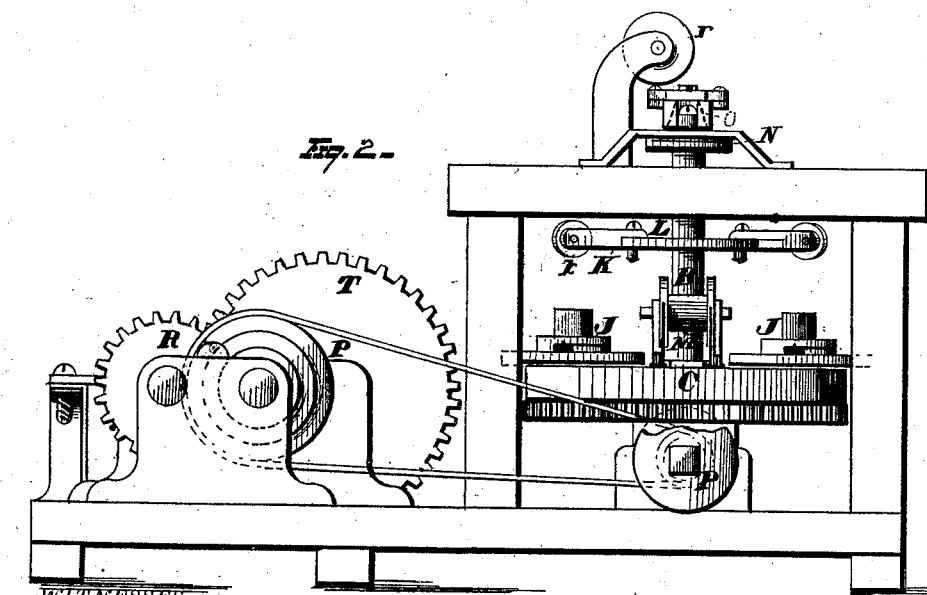
WITNESSES
Ed. F. Nottingham
F. O. McCleary
INVENTOR
Mahlon M. Zellers.
By Leggett & Leggett
Attorneys M. M. ZELLERS.
WIRE-ROPE MACHINE.
No. 184,196. Patented Nov. 7, 1876.
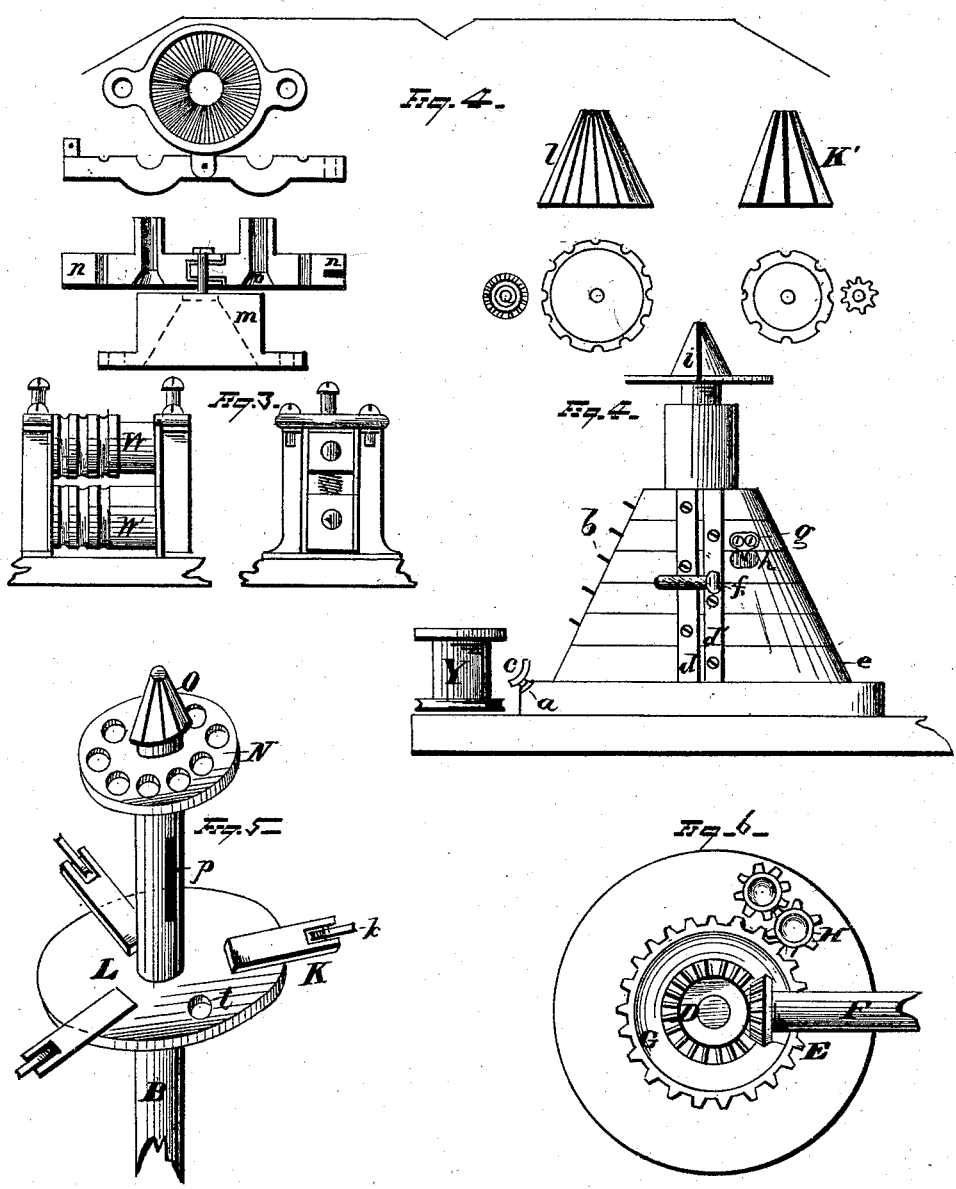

UNITED STATES PATENT OFFICE.

MAHLON M. ZELLERS, OF KENT, OHIO, ASSIGNOR OF ONE-HALF HIS RIGHT TO EDWARD L. DAY, OF SAME PLACE.

IMPROVEMENT IN WIRE-ROPE MACHINES.

Specification forming part of Letters Patent No. 184,196, dated November 7, 1876; application filed July 20, 1876.

*To all whom it may concern:*

Be it known that I, MAHLON M. ZELLERS, of Kent, in the county of Portage and State of Ohio, have invented certain new and useful Improvements in Wire-Rope Machines; and I do hereby declare the following to be a full, clear, and exact description of the invention, such as will enable others skilled in the art to which it pertains to make and use it, reference being had to the accompanying drawings, which form part of this specification.

My invention relates to an improvement in machines for making wire-rope.

Figure 1 is a plan view, with upper half of shaft and part of frame removed. Fig. 2 is a side elevation. Fig. 3 represents a side and end view of the rope-holding device. Fig. 4 is a view of one of the strand-formers, with top removed and side and plan views of the several parts composing said top. Fig. 5 represents part of upright shaft with some of its attachments. Fig. 6 is a view of the parts below the platform, showing how motion is communicated from the power-shaft.

The invention consists in the parts and combinations, as hereinafter specified and claimed, wherein A represents the frame of the machine. B is an upright shaft carrying the circular platform C, and receiving motion from power-shaft F through the medium of bevel-gears D and E. The vertical shaft B carries also the disk L adjustable thereon, to which the arms K, carrying strand-receiving pulleys $k$, are attached. The platform C carries the strand-formers J, which are always equal in number to the strands it is desired to combine in the rope. Their shafts pass through the platform and carry small cog-wheels I, which mesh with reversing pinions H journaled to the under side of the platform, which last gear with the fixed circular rack or cog wheel G, so that when the platform is revolved the motion imparted by the fixed rack to said pinions is transmitted to the cog-wheels I, thus revolving the strand-formers in an opposite direction to the motion of the platform. J is one of the strand-formers attached to the platform, as before described and constructed, as follows: Its body consists of several disks, $e$, gradually diminishing in size and loosely mounted on the shaft, except the lower one, which is firmly attached to the base; or each alternate one may be firmly attached to the shaft, and motion be imparted to the remaining ones only. Plates $d\ d'$ connect alternate disks with each other in such a manner that no one disk is connected with both plates. Each disk is provided with several projecting tension-pins, $b$, and each strand-former with an indicator, $g$, and scale $h$. Each strand-former is also provided with several spools for carrying the wire, the rims of which spools are grooved for the purpose of retaining a spring which bears therein and acts in the nature of a brake. The wire from these spools passes through opening $a$ in the base-plate of the former on through the opening formed behind the plate $c$, alternately to one and the other side of the tension-pins, which regulate the tension by being moved in or out of a straight line. This is effected by turning the screw $f$, which separates or brings together the plates $d\ d'$, according to the direction in which it is turned. The amount of tension is indicated by the hand and scale $g\ h$, and as each strand-former is provided therewith the tension on all the wires can readily be equalized. The top cone $i$ is provided with a groove for the guidance of the central wire, around which the strand-wires are twisted. A second cone, $k'$, with grooves on its surface, in number equal to the wires to be twisted around the central one, fits over cone $i$.

Cones, with a larger number of grooves, may be made to fit over each other, or only over the first cone $i$, as may be desired. Over the cones fits the cover $m$, which carries the forming-die $n$.

A similar device to that just described, properly called the rope-former, is carried by the vertical shaft, only that the grooves in the cones are larger to admit of strands instead of wires. The vertical shaft has also a longitudinal passage communicating with a central passage through its cone, for the central cord or core which enters the passage at $p$. The rope-receiving pulley $r$ is located above the rope-former.

U is the rope-receiving drum, having the flange V. The rope from the pulley $r$ is carried several times around the drum, and that section of the rope which rests on the flange V pushes its neighboring coil toward the middle and away from the flange, thus performing an operation usually performed by additional devices. W W' are the rope-holding rolls, provided with grooves of various sizes to accommodate ropes of different thicknesses. They are adjustable by a set-screw, and are provided with springs between their journal-boxes, which move the rolls apart upon the release of the set-screws. The rollers receive motion from a belt around drum U, which, in turn, has motion imparted to it by means of cog-wheels, pinions, and speed-pulley, the latter connected with a similar pulley on power-shaft.

The operation of the machine is as follows: The wire from each one of the several spools, on each strand-former, is passed through its corresponding opening $a$, and around its series of tension-pins $b$, which are adjusted to the same degree of tension on all the strand-formers, as before described. The wire, to form the center wire of the strand, is passed from its spool through the groove in the first cone, and the other wires after passing the tension-pins pass through the guiding-grooves in the second or third cone. The central and other wires pass from thence through the forming-die $n$ and over the strand-receiving pulleys $k$.

When the machine is set in motion by power applied to shaft F the platform revolves, and with it the strand-formers, which have a revolving motion of their own in the opposite direction. The wires from each former are thus twisted into strands in the dies $n$, in which form they pass over the strand-receiving pulleys $k$. These strands, one from each strand-former, pass through the openings in disk N, and through guiding-grooves in the cone O. The central cord or core for the rope passes from a spool on the platform through opening $t$ of disk L, and by passage $p$ through the center of the shaft and its cone O. These strands then pass through the forming-die and over the rope-receiving pulley $r$. Motion being imparted to the machine, the wires are formed into strands in their formers $n$, and these strands are twisted into a rope in the upper forming-die, and pass in that finished state over said pulley $r$.

It will be observed that the upright shaft carrying the rope-forming die moves in an opposite direction to the strand-formers, which is necessary by reason of the twist given to the strands. The finished rope is then passed several times around the drum U, which receives motion, as before explained, and draws the rope over the pulley $r$. The rope from the pulley is received on the flange for the purpose as before described.

The rope is held by the rolls W W', which are revolved by means of the belt connected with drum U, and discharge the rope from the machine.

Speed-pulleys P P' and belt Q operate to effect a variable draft on the rope, and by means of which the strands of the rope may be laid open or close, as desired.

It will be observed that the wire-guiding device, as before stated, may either be formed in separate sections with intermediate grooves, as shown, or they may be made solid, and perforations be formed, through which the wires or strands are fed, or I may combine a perforated section with a grooved section.

I have used both perforated and grooved wire-guides, but prefer the sectional grooved form shown.

So, also, it is apparent that the forming-dies, either for the rope or for the strands, may be made solid, or they may, as shown in the drawings, be made in sections, and united in any suitable manner, so as to be opened and closed at will, and at any time during the operation of the machinery.

I also find the variable feed between the driving mechanism and the receiving-drum to be very desirable, in order to give any desired rapidity of draft to the rope, and thereby to regulate the lay of the rope, so that with the same rate of revolution to the strand-forming tables, I can, by increasing or decreasing the speed at which the receiving-roller draws the rope from the machine, make the rope of more open or of closer lay, respectively, as may be desired.

So, also, it is apparent that the same forming-die can be employed for the same sized rope or strand, no matter how many wires or strands may be employed, and the same wire or strand guiding-pieces may be employed for delivering any desired number of wires or strands, and it is only necessary to change the forming-dies, when a different-sized rope or strand is to be formed.

What I claim as my invention, and desire to secure by Letters Patent, is—

1. The combination, with the rope-former, of the table C, carrying independent strand-formers J, constructed as shown, and reel M, substantially as and for the purpose described.

2. In combination with the spool-carrier, the tension device for giving tension to the wires as they are drawn from the spools, consisting of the superposed disks $e$, each provided with friction-pins $b$ and adjusting mechanism, whereby the several disks may be adjusted alternately in opposite directions, thereby giving any desired degree of tension to the wires simultaneously, substantially as and for purpose described.

3. In a strand-former, the combination, with spools attached to a revolving table or disk, of tension-regulating devices, one for each spool, the same constructed to be adjusted simultaneously, substantially as and for the purpose set forth.

4. In a strand-former, the combination, with spools attached to a revolving table or disk, of the several disks $e$, provided with tension devices $b$ and adjusting device $f$, substantially as and for the purpose specified.

5. In a strand-former, the combination, with spools, attached to a revolving table or disk, of the several disks $e$, provided with tension devices $b$, the adjusting device $f$, and indicating device $g$, substantially as and for the purpose specified.

6. In a strand-former, the combination, with spools attached to a revolving table or disk, of disks $e$, tension devices $b$, adjusting device $f$, and perforated guide piece or pieces, substantially as and for the purposes set forth.

7. In a strand-former, the combination, with spools attached to a revolving table or disk, the several disks $e$, tension and adjusting devices $b\ f$, of the perforated guide piece or pieces, and forming-die, substantially as and for the purpose set forth.

8. In a rope-machine, the combination, with strand-formers, each consisting essentially of a table or disk, carrying spools arranged about several tension-regulating disks, a perforated guide-piece and forming-die, of a rope-former, consisting of shaft with passage $f$ for guiding the central strand, and perforated guide-piece for receiving and guiding the several strands, substantially as and for the purpose specified.

In testimony whereof I have signed my name to this specification in the presence of two subscribing witnesses.

MAHLON M. ZELLERS.

Witnesses:
CHAS. B. NEWTON,
M. G. GARRISON.